Patented Mar. 10, 1936

2,033,132

UNITED STATES PATENT OFFICE 2,033,132

DIENE TYPE REACTION PRODUCT AND METHOD OF MAKING SAME

Carleton Ellis, Montclair, N. J., assignor to Ellis-Foster Company, a corporation of New Jersey No Drawing. Application August 7, 1931, Serial No. 555,868

15 Claims. (Cl. 260—112)

This invention in its primary phases relates to chemically altered glyceride oils and/or their fatty acids or a constituent fatty acid, particularly unsaturated fatty acids of glycerides, hence containing 12 or more carbon atoms in the acid molecule; specifically tung oil and/or its fatty acids altered to secure different characteristics by reaction with a compound preferably containing the group —CO—CH= or similar or analogous reactive group or bodies generating same, including the quinones such as benzoquinone and naphthoquinone, aldehydes such as acrolein and crotonaldehyde, likewise their corresponding acids, maleic and fumaric acids and anhydrides, itaconic and citraconic acids, maleinanilic acid, cinnamic acid, and the like.

In the following description tung oil and/or its fatty acids will be used to exemplify an unsaturated oil capable of alteration by the foregoing reaction but it should be understood that other analogous reactive raw materials may likewise be employed. These acids (including the oils and fats containing them) are herein designated "oil acids" or "fixed oil acids."

For convenience, therefore, the term "oil acids" will have the meaning ascribed above and the term "reactive unsaturate of oil acid alteration" or "reactive crystallizable acid unsaturate" will be used in making reference to the agent of oil alteration.

The initial unsaturated acid or acids preferably employed herein, for reaction with the oil acids, generally are those having less than 12 carbon atoms (normally from 3 to 10 carbon atoms) when of the aliphatic series, although they may have a larger number of carbon atoms when of the aromatic or cyclic series. Usually and preferably they are crystallizable. Such initial un-/saturated aliphatic acids preferably are polybasic, normally being dibasic or tribasic, including maleic, fumaric, itaconic and citraconic acids, and so forth. An extreme degree of unsaturation is represented by the more unstable acetylene dicarboxylic acids.

Of these acids maleic acid which is readily available through methods of oxidation of benzol and the like will be used illustratively herein. Next in order of availability is, perhaps, fumaric acid.

In many cases the anhydrides of such acids or other acid-yielding bodies of an equivalent character are obtainable and in many cases are preferable to the acids themselves. However, in the present specification the term "acid" will be considered to cover the corresponding equivalent anhydride and on the other hand the term "anhydride" will be held to cover the corresponding equivalent acid; all comprehended by the expression resinifying or reactive acid material.

While the prefered form of the primary phase of the invention is concerned with the production of an altered drying oil of the tung oil type and the utilization of such altered tung oil, especially in water-soluble form as later described, in various ways, I wish to call attention to one possible utilization of this altered oil as a raw material in the preparation of a class of resins which are known as "Rezyls".

In several copending applications I have referred to maleic acid or its anhydride and the like in connection with the production of resinous bodies involving reaction between such acid material and a polyhydric alcohol, with or without a modifying agent such as a higher fatty acid (e. g., a fat acid) and the like.

Thus in application, Serial No. 609,136, filed December 26, 1922, entitled Artificial resins from glycerol and the like, there are disclosed polyhydric alcohol-polybasic acid condensation products modified by higher fatty acids and agents accelerating the conversion of the polyhydric alcohol-polybasic acid condensation products into products of decreased solubility and fusibility, the claims of that application being primarily directed to the polyhydric alcohol organic carboxylic acid condensation products containing materials capable of accelerating the conversion of such products into products of decreased fusibility and solubility. In Serial No. 61,839, filed October 10, 1925, entitled "Resinous products or compositions and process of making same" there are particularly described and claimed products and methods of making same including resinous condensation products of the polyhydric alcohol-polybasic acid type, containing vegetable oils, specifically siccative oils, and acids derived from such oils in combination. Among the acids that may be employed in the production of such complexes as disclosed therein, there may be mentioned maleic and fumaric acids, but these condensation products produced with such materials specifically are not specifically claimed in that application. In application, Serial No. 142,- 532, filed October 18, 1926, for "Coating compositions comprising a soluble cellulose compound and a protective agent", there is specifically disclosed and claimed coating compositions, such as nitrocellulose-containing compositions, including protective resins, particularly those of the polyhydric alcohol-polybasic acid type, including fatty acids of the vegetable oils, particularly the siccative oils in combination in such resin complexes. As disclosed therein, polybasic acids, such as maleic and fumaric acids may be utilized in the production of those complexes for utilization in the coating compositions, but the claims of that application are more particularly directed to the nitrocellulose-containing compositions, and to resins of the polyhydric alcohol-polybasic acid type utilizing pentaerythritol as the polyhydric alcohol. In application, Serial No. 279,216, filed May 19, 1928, for Products consisting of or containing resins, etc., there are particularly described and claimed methods of producing polyhydric alcohol-polybasic acid resins, and the resins themselves in which fatty oils or triglyceride fats or related materials are in chemical combination, the glyceride oils and fats, including the drying oils, such as tung oil, being sensitized by treatment with a sensitization agent prior to the resinification reaction. For example, the drying oils may be resinified by first sensitizing them by treatment with either alcohols or organic carboxylic acids followed by further treatments to produce the resins. Among the polybasic acids utilized as disclosed therein, there may be mentioned phthalic anhyride and equivalent materials. And among the oils that may be treated, there may be included tung oil, linseed oil, etc. The claims are more particularly directed to the products and methods of producing such products involving the sensitized fats or oils utilized in the production of such resins. In Serial No. 425,711, filed February 3, 1930, for Water and resin compositions, there are particularly disclosed and claimed polyhydric alcohol-polybasic acid resins in the form of alkali salts soluble in water. The maleic type materials are not specifically claimed therein.

Substituted polybasic carboxylic acids may be used as resinifying agents and mixed fatty acids of the vegetable oils as modifying agents of resinification of polyhydric alcohols and substituted polybasic carboxylic acids.

Drying oils, if sufficiently well combined, form especially desirable components of resins and other complex products of the present invention. They may be treated by the sensitizing process where the drying oil is first heated with the acid agent before reacting with a polyhydric alcohol to institute resinification.

In the preferred form of the present invention maleic acid (page 2 of Serial No. 279,216) is employed with drying oil, especially tung oil, to activate the latter by combining therewith (in accordance with the teachings of Serial No. 279,216 including Example 9, page 20), which activated oil may be used in the cited application as a raw material for the production of resins, but which, in the present application may be used in various other ways, as will be described.

Maleic acid and tung oil mentioned in Serial No. 226,826 (pages 4 and 5 respectively) as well as the fatty acids of the latter may simply by heating together result in reaction affording an activated tung material serviceable by itself for many purposes and among other utilizations be easily reacted further by treatment with a polyhydric alcohol with or without an added polybasic acid, such as phthalic anhydride, to yield balsams and resins.

Maleic acid may be brought into combination with glycerol and a fat acid, viz., stearic acid.

Since one phase of the present invention relates to a diverse series of products which are soluble in dilute aqueous alkaline media, attention also is called to Serial No. 425,711.

Aside from increased cost the use in coating compositions of volatile inflammable solvents is objectionable in some cases. Products can be obtained by the present synthesis which are soluble in water containing a volatile alkali, e. g. ammonium hydroxide, and when such a solution is applied as a coating the ammonia escapes leaving a surface finish which is well suited for protective or decorative effects. By using alkali-stable pigments or colors in such solution, cold water paints or stains of various shades may be secured.

The synthesis between the oil acids and the reactive unsaturate of oil alteration may be carried ordinarily merely by heating. Thus, tung oil and maleic acid are heated in a manner suitable to activate or sensitize the oil (as described in Serial No. 279,216) and greatly increase its acidity, reaction taking place with union of the acid and oil, forming an oil containing acid group which may be regarded as a polybasic acid or anhydride. The locus of coupling with the oil probably is through the conjugated double-bond linkage of the latter, constituting a diene synthesis. Assuming the double bonds at the 9th and 11th carbon atoms of the oil molecule, the opening of the double bond of the maleic group may be expected to form a cyclic body with 6 carbon atoms in the ring, resulting in a derivative of phthalic acid.

The temperature of reaction of this diene synthesis may be varied over quite a range, reaction being slower if the temperature is low. Between 125 and 150° C. some reaction occurs but better results are obtained for most purposes by heating at a temperature above that at which maleic acid becomes the anhydride, or 160° C. and upwards. On the other hand, the maximum temperature to be used in carrying out this reaction when tung oil is the "oil acid" (such acid being in combination as the glyceride) and maleic acid is the reactive crystallizable acid unsaturate, ordinarily does not exceed about 200° C. in the earlier stages of reaction, the range between 150 and 200° C. being suitable, although in some cases higher or lower temperatures may be used. The progress of the reaction may be followed in a rough way by the disappearance of turbidity due to combination of undissolved maleic acid or anhydride. At a temperature near 200° C. this clarification goes on rapidly. Finishing temperatures well above 200° C. frequently are desirable, e. g. 250° or 275° C. The tung polybasic acid anhydride (assuming an adequate proportion of maleic acid has been used) behaves quite differently from the original tung oil, being for one thing, soluble in dilute aqueous alkalies. By proportioning the amount of water, viscous or syrupy solutions result which, as noted, can be applied as coatings; the ammonium compound being, generally speaking, the most suitable. Drying of the coating may be facilitated by baking or stoving the coated article at elevated temperatures. The siccative properties of the tung oil are not altered to such an extent that oxidation-drying is inhibited but baking is recommended for the treatment of metal articles which have had a coating of the aqueous ammoniacal composition in order to fully expel ammonia.

Additions of modifying substances such as aqueous ammoniacal solutions of shellac or rosin or oxidized rosin may be made. Resins of high acidity of the type made from a polyhydric alcohol and a polybasic acid with or without a monobasic acid which are soluble in aqueous alkaline solutions likewise may be incorporated if desired. These compositions likewise may be used as coating, finishing and polishing agents.

Proteins such as casein or glue also may be introduced as well as gums such as gum arabic, gum acacia and the like.

In a similar manner, starch, soluble starch or flour which have been cooked in water may be incorporated. Pastes, adhesives, paper coating and impregnating material and the like may be made with the soluble maleic derivative alone or with such additions. Viscose may be incorporated and the composition used in a similar way. The viscose, e. g. viscose silk, may carry a water-proofing proportion of the water-soluble oil.

Thus the altered oil of water-soluble characteristics as aforesaid may be incorporated with a great variety of water-soluble or emulsifiable materials.

There follows a series of examples which illustrate reaction between the oil acids (free or combined as in glyceride oils) and the reactive unsaturate of oil acid alteration, specifically a reactive crystallizable acid unsaturate such as maleic acid.

Parts given in the following examples are by weight.

Example 1

A mixture of 30 parts tung oil and 12 parts of maleic acid was heated to 150-200° C. to cause combination. The temperature was then carried to 282° C. at which temperature tung oil alone, of the grade used, will gelatinize in about 8 minutes. Due to the reaction with maleic acid gelatinization did not occur at 282° C. after such heating for 1 hour, the oil merely becoming slightly more viscous. At the end of 1½ hours' heating at this temperature no gel had formed, the oil still being fluid when hot. On cooling a viscous, tough mass suggestive of the presence of rubber resulted. This product was soluble in, for example, toluol yielding a very viscous solution. The complex was also soluble in aqueous alkaline media.

It may be noted that maleic acid melts at about 130° C. and starts to change to the anhydride at about 135° C. At 160° C. the conversion to the anhydride is very rapid. The anhydride does not boil until a temperature of 202° C. is reached. So the initial heating if carried out at atmospheric pressure is best conducted at a temperature below 202° C. to avoid loss of maleic acid. Once the acid is "fixed" by entering into combination with the oil the temperature may be raised further. In some cases the heating may be carried out under superatmospheric pressure. As the boiling point of fumaric acid is higher than maleic a correspondingly higher temperature may be used with the former when the reaction is carried out at atmospheric or subatmospheric pressures.

Example 2

A mixture of 10 parts tung oil and 1 part of maleic acid was heated directly to 282° C. and held at this temperature. Gelatinization occurred in 18 minutes as contrasted with 8 minutes for the oil alone, and with the far longer period noted in Example 1 where fixation of the maleic acid first was secured followed by heating the reaction product to 282° C.

Example 3

Tung oil, 100 parts, was heated to 175° C., 40 parts maleic acid were added gradually over a period of ½ hour. This procedure of addition in small portions prevents the excessive foaming which results when the full amount of maleic acid is added all at one time. The temperature was raised to 200° C. and held at this point for one-half hour when the altered oil or tung-maleic oil complex was allowed to cool.

An oil obtained in this way dries to give a clear film instead of the frosted effect which is characteristic of ordinary tung oil. The oil dries more slowly than ordinary tung oil, which suggests coupling between the acids of the glyceride and the maleic acid taking place at one or more of the double bonds of the oil acids. The oil is heavier than water, whereas tung oil is lighter than water. The maleic acid cannot be extracted by boiling the product with water. The oil is soluble in aqueous alkalies. The oil reacts readily with glycerol forming a complex which polymerizes quickly on further heating. The oil does not gelatinize as does tung oil. Neither maleic acid nor the anhydride is soluble to more than a slight degree in tung oil at ordinary temperatures.

When a mixture of maleic acid and tung oil is heated the acid first melts to form a lower phase. If this is vigorously stirred into the oil and the mixture cooled as rapidly as possible, practically all of the maleic acid crystallizes out. However, if the mixture is heated for a sufficient time above about 135° C. the oil when cool is clear. The phases have disappeared. These observations are indicative of the formation of a definite complex when maleic acid and tung (China-wood oil) are heated together.

Example 4

Soya bean oil was heated to 130° C. and 10 per cent of maleic acid added gradually, the temperature then being carried to 200° C. On heating to a temperature somewhat below 100° C. and washing with a 5 per cent aqueous solution of sodium bicarbonate an upper layer separated as an emulsion, the lower aqueous layer being opalescent. On acidification of this layer no oil separated.

When a mixture of 9 parts soya bean oil and 1 part tung oil was similarly treated the acidification of the aqueous layer caused separation of an oil representing the tung maleic oil complex formed by the reaction. This procedure provides a method of separating dissimilar oils or components of reactive characteristics.

Fish oil is more reactive than soya bean oil but does not couple with maleic anhydride as readily as tung oil.

Example 5

The tung maleic oil complex dissolves in aqueous solutions of triethanolamine giving solutions which, even though turbid, will dry in thin layers to give a clear, somewhat sticky film.

When, however, the tung maleic oil complex and triethanolamine are mixed in the substantial absence of water different results are obtained.

10 parts of the tung maleic oil complex and 2.7 parts triethanolamine were stirred together. The amine and oil were miscible. In less than 1 minute the temperature rose and a slightly sticky rubbery substance formed. This was not soluble in water although swelling therein. The amount of amine used in this case was half the amount required to combine with "maleic" group of the oil complex.

The proportion of the amine then was doubled to provide sufficient thereof to combine with the acid group fully, the temperature being raised to 50° C. to assist combination. This product was a very viscous liquid soluble in water.

Example 6

10 parts of the tung maleic oil complex were stirred with 3.5 parts of aniline. A clear solution resulted which heated spontaneously to some extent and increased in viscosity. Heat then was applied and the temperature raised to 100° C. to complete the reaction. When cold the product was a clear heavy balsam. Applied as a coating hardening took place over night despite the absence of driers. A tough film resulted. Driers such as a cobalt compound could be added to quicken the drying. This aniline reaction product is insoluble in water.

A harder product is obtained with naphthylamine. 10 parts tung maleic oil complex and 2.8 parts alpha naphthylamine were heated together to 140° C. The viscosity increased and when cool the product was a flexible, slightly tacky resin. It is soluble in toluol, insoluble in alcohol and acetone.

Example 7

Aqueous ammoniacal solutions of the tung maleic oil complex were tested for compatibility with various water-soluble substances. It was found to be compatible with glue or gelatine, glycerol, ethylene glycol, diethylene glycol or diethylene glycol monoethyl ether and the like. Albumin could not be incorporated as readily.

10 parts of the tung maleic oil complex and a like amount of casein, 7 parts concentrated ammonium hydroxide solution and 73 parts water were mixed giving a thick cloudy solution. Applied as a coating the layer dried over night to a clear hard and tough film.

Example 8

Solutions were made in dilute ammonia water of (1) Congo resin, (2) shellac, and (3) rosin which had been oxidized by gently heating the powdered material in air for some time. These solutions were separately mixed with an ammoniacal aqueous solution of the tung maleic oil complex. Each of the compositions so made gave clear films when dried on glass. The resins increased the hardness of the film over that normal to the oil complex itself.

Similarly mixtures of resin solutions such as a mixture of (1) and (3) or (2) and (3) may be incorporated with the oil complex in various proportions, e. g. 1:1; 1:2; 1:3; 1:4 and in these proportions reversed.

Example 9

Aqueous alkaline solutions of resins of the Rezyl type made by reaction between a polyhydric alcohol, a polybasic acid and another modifying acid likewise may be incorporated with aqueous solutions of the tung maelic oil complex.

A commercial grade of water-soluble phthalic glyceride resin was dissolved in ammonia water and the solution added to an ammoniacal solution of the tung maleic oil compound. Approximately equal proportions of the resin and the oil were used. Thin films when dry were transparent. Baking of the film at 100° C. hardened it and improved its clarity.

Example 10

A 20 per cent aqueous solution of the tung maleic oil compound was made using ammonium hydroxide as the alkali. Thin copper wire was passed through this solution and then through an aperture slightly larger than the wire, so as to leave on the wire a thin uniform film of the solution. The wire then was baked at 80° C. thereby forming an adherent and flexible insulating coating over its surface.

Example 11

10 parts of the tung maleic oil compound were heated slowly with 1 part of glycerol. The latter dissolved in the oil at about 170° C. and water vapor started to come off in the neighborhood of 175° C. The viscosity began to increase at 225° C. and a sample was removed at a temperature between 225° and 228° C. When cold this was somewhat elastic. It was soluble in toluol. The solution applied as a coating dried over night giving a tough film free from tackiness. The addition of cobalt drier accelerated the drying of the film.

The remainder of the batch after removal of the sample at about 228° C. was heated further. A polymerized insoluble resinous mass formed at about 230° C. The soluble product had therefore been removed just prior to the initiation of insolubility.

From the maleinized tung oil which to all intents and purposes may be regarded as a polybasic acid there may be formed salts of inorganic bases as well as those of organic bases. Moreover these salts may be neutral, basic or acid. Also one acid group may be neutralized by a water-soluble base, a second acid group by a base forming a water-insoluble salt. One or more of the acid groups may be combined with an oxide of lead, manganese and/or cobalt to secure a self-contained drier, designated an integral drying catalyst.

A salt of such polybasic drying oil whether water-soluble or organic-solvent-soluble may be used to form coatings, air-dried and/or baked on articles of the group of materials comprising metal, wood and paper. The water-soluble maleinized tung oils are proposed for use (among other applications) as a baked coating for covering the interior of tin cans used in the packaging of foodstuffs of the canned or "tinned goods" type.

Another quite dissimilar use of the maleinized oil is to treat it with a polyhydric alcohol such as glycerol, as illustrated, to form solid products, e. g. resins and plastics. An intermediate stage of resinification produces balsamic products. Hence the maleinized oil may, in one phase of the invention, be utilized as a polybasic acid providing a raw material for the production of resins of the polybasic acid-polyhydric alcohol type. This means that it may be reacted with glycerol, glycol and the like with or without other polybasic acids such as phthalic anhydride, succinic acid and so forth, further with or without a monobasic acid such as oleic, benzoic, salicylic, stearic, cottonseed fatty acids, linolic, linolenic acids, and the free acids of normal tung oil particularly for the purpose of obtaining resins soluble in organic solvents which may be used as siccative or non-siccative components of coating compositions, in which the resin may perform the office of the sole binding and film-forming agent or may be used with supplemental film-formers such as nitrocellulose, cellulose acetate and other cellulose esters, ethers and analogous soluble cellulose bodies.

Example 12

100 parts tung oil and 50 parts phthalic anhydride were heated to about 250° C. and of this mixture 60 parts were treated with 16 parts maleic acid. The temperature was carried ultimately to 250° C., then cooled to 200° C. and 17 parts glycerol added. The glycerol dissolved on heating a few minutes at 200° C. The temperature was raised to 210° C. and held at this point for ¾ hour. The product was quite viscous when hot and when cold was a soft rubbery mass, soluble in toluol and butyl acetate. The acid number was 110. On heating for a period of 1 hour instead of ¾ hour the product is no longer soluble.

Example 13

Solutions of soluble maleinized tung oil and of cellulose acetate in acetone were separately prepared and mixed to give a proportion of 1 part of the tung compound to 10 parts of cellulose acetate. Clear films were obtained on drying.

Example 14

Glycerol is compatible with maleinized tung oil in aqueous ammoniacal solution and as illustrated in the foregoing will react on heating to give an insoluble body. The following shows that this reaction can be brought about in thin layers which form coatings. 10 parts maleinized tung oil, 1 part glycerol, 36 parts water and 4 parts concentrated aqueous ammonium hydroxide were mixed to form a solution which was applied to a metal panel and allowed to air-dry for one-half hour. A clear tacky film was formed which was baked for 7 hours at 90° C. thereby causing the glycerol to react in situ with the maleinized tung oil.

Example 15

Maleinized tung oil and resorcin, heated with a small quantity of sulphuric acid, to 200° C., gave a product which dissolved in ammonia water to give a fluorescent solution, the two colors being bright green and brown.

Example 16

10 parts maleinized tung oil were dissolved in a dilute aqueous solution of sodium hydroxide (1½%). Calcium chloride sufficient to form the normal salt of the maleic radicle was added forming a whitish voluminous precipitate. On drying the product is insoluble although swelling somewhat in toluol. It is insoluble in tung oil.

Example 17

20 parts of maleinized tung oil and 1.3 parts calcium hydroxide were heated to 250° C. for ½ hour. This amount of calcium hydroxide represents one-half the proportion of calcium used in the preceding example and is just sufficient to form a half-acid salt of the maleic radicle. Most of the calcium hydroxide went into solution. The limed maleinized tung oil was considerably more viscous when cool than the unlimed. 20 parts of rosin were added and heating resumed at 250° C. The residue of undissolved calcium hydroxide went into solution. $\frac{1}{10}$ part of cobalt acetate was added and the melt heated for ¼ hour at 250° C., then cooled to 200° C. and thinned with 35 parts mineral spirits (Varnolene). A heavy-bodied dark colored varnish was obtained which remained clear on standing 24 hours indicating that the calcium and cobalt compounds were in solution.

Maleinized tung oil containing an integral drying catalyst such as cobalt, lead or manganese, tung-maleate thus may be prepared including various mixed driers and mixed salts based on the coupling of one carboxyl group with one base and combining a second base with a second carboxyl group when a dibasic coupling acid of the character of maleic acid is used. When the acid is tribasic or contains a still higher number of carboxyl groups or equivalent anhydride groups the salts which may be formed may be still more complex.

The salts of the maleinized tung oil or tung-maleates therefore may be of a water-soluble or a water-insoluble character, this invention relating to such products and method of preparing same, involving in its specific aspects the reaction between tung oil or its acids and maleic, fumaric acids and anhydrides, and the like, or substances generating reactive acids of this character; still more specifically dibasic acids containing the group —CO—CH=, as well as acids capable of generating products containing this group such as may be secured by heating malic and citric acids, and the like: the resulting tung compound with the acidic coupling body being treated with one or more bases to form various compounds thereof, such salts being united principally through the carboxyl of the acidic coupling compound rather than through any saponification of the tung oil material itself. (The term tung oil material is used herein to cover glyceride oils and their acids having a reactive character represented by tung oil, that is China-wood oil).

Example 18

20 parts tung-maleic compound were heated to 250° C. with ½ part cobalt acetate. Practically all the cobalt dissolved. The product was soluble in benzol and toluol. While it was soluble in a grade of mineral spirit when the latter was heated, precipitation occurred on cooling. The addition of benzol prevented precipitation, a mixture of 1 part benzol to 4 parts gasoline being suitable. The rate of drying of a coating is accelerated through the presence of the cobalt and as more cobalt is present than is necessary for acceleration of drying, this composition could be used as an addition to other siccative oil compositions as a drier.

Example 19

10 parts of the product obtained according to Example 18 were dissolved in 11 parts of water and 4 parts concentrated aqueous ammonia. This produced a heavy, reddish, slightly turbid solution which dried to give a clear film. Hardening occurred more rapidly than when cobalt is not present.

Example 20

20 parts tung-maleic compound and 1 part litharge were heated slowly to 250° C. Most of the lead oxide dissolved, giving a rather dark colored oil. When cool the oil was more viscous than originally. This oil is soluble in aqueous ammonia solutions, giving a clear product. A thin film was formed on a tin panel and baked at 80° C. for 1 hour. At the end of this period of time it was free from tackiness and very adherent.

Example 21

10 parts of the tung-maleic compound were treated with 20 per cent solution of borax, adding altogether sufficient of the solution to incorporate 10 parts of borax. On boiling a solution was obtained which was entirely clear but on cooling separation took place. In these conditions application of the solution would have to be made while hot.

Example 22

10 parts tung oil and 3½ parts maleic acid were placed in a sealed tube and heated in an oil bath. The tube was first heated for 3 hours at 120° C. without apparent change. The temperature was then raised to 130° C. for 3 hours but there was still no change apparent. 130° C. is below the decomposition point of maleic acid to the anhydride. The temperature was then raised to 150° C. for 2 hours, causing a part of the visible acid to disappear. Finally the tube was heated to 190° C. for 1 hour, when practically all of the acid was found to have gone into solution or been reacted by the oil. During this heating the tube was shaken occasionally in order to mix acid and oil. When the tube was opened the product was found to be practically a solid gel. This, however, is not ordinary gelatinized tung oil, since the gel is fusible. Moreover it is soluble in aqueous ammonia solutions. From the foregoing it would appear that maleic acid itself does not combine with tung oil nearly as readily as when conditions are established to create the anhydride. The product obtained is probably a dibasic acid rather than an anhydride, since the water formed on conversion of the maleic acid to the anhydride very possibly reacts with the cyclic anhydride after formation of the latter, yielding the dicarboxylic acid.

The acid number of this gel is nearly 240, two determinations by different methods giving respectively 236.3 and 237.4.

Example 23

Fumaric acid reacts with tung oil in somewhat the same way as maleic acid, although at a higher temperature. 30 parts of tung oil and 12 parts of fumaric acid were heated. The acid did not dissolve in the oil until a temperature of about 230° C. was reached and at this point the acid dissolved or reacted with much foaming. The reaction product was slowly heated to 260° C. thereby obtaining a clear viscous oil, soluble in aqueous ammonia solutions. It should be noted that the reaction temperature is above the decomposition point of fumaric to maleic acid.

Example 24

60 parts tung oil and 30 parts malic acid were heated gradually and at 240° C. vigorous foaming occurred and the temperature was held at this point for half an hour until the acid had dissolved and foaming was beginning to subside. The temperature was then increased to 260° C. The product was a clear viscous oil somewhat similar to that obtained by the use of maleic acid.

Example 25

When heated citric acid breaks down into citraconic acid and other products. The present example is concerned with the possible union of the citraconic acid and perhaps other products of decomposition with tung oil. 30 parts tung oil and 21 parts citric acid were heated. Gentle foaming occurred at about 210° C. The temperature was held at this point until the acid had all dissolved. Then the temperature was increased to 260° C. The product is a hard oil seemingly somewhat heavier than that obtained by means of maleic acid but the oil forms a very clear solution in aqueous ammonium hydroxide.

Example 26

The free fatty acids of tung oil were obtained by saponification and 100 parts of these acids were heated with 32 parts of maleic acid. The reaction progresses very much like that occurring with tung oil. A great deal of foaming was noticed to occur at about 140° C. The temperature was carried finally to 260° C. The product was a clear rather dark colored oil, slightly more viscous than the product made with the tung oil glyceride itself. The tung acids-maleic compound is readily soluble in aqueous ammonium hydroxide, such solutions possessing the advantage of a lower viscosity than the product obtained when tung oil is reacted with maleic acid.

Example 27

20 parts of the compound obtained according to Example 26 were reacted with 5 parts of glycerol by heating gradually. Reaction (probably polymerization) occurred at 240° C. forming an insoluble compound.

Example 28

30 parts of blown tung oil and 12 parts of maleic acid were heated, a large amount of foaming occurring at 125° C. and upwards. At 170° C. the mixture polymerized to an infusible mass.

Example 29

Proportions of blown tung oil and maleic acid were used like those of Example 28, but the heating was arrested at 160° C. The product is very sticky, stringy and viscous. It is soluble in aqueous sodium hydroxide solution and partially soluble in aqueous ammonium hydroxide.

Example 30

For coating purposes concentrated aqueous solutions of the tung-maleic compound may be applied by brushing. A 50 per cent ammoniacal solution of the tung-maleic compound is too viscous to spray. A coating composition was made in the proportion of 50 parts tung-maleic compound, 25 parts concentrated ammonium hydroxide and 200 parts of water. This sprayed fairly well but on an upright metal surface there was considerable running or dropping. The addition of between 20 and 25 parts of isopropyl alcohol greatly reduced the viscosity. A composition which sprays to better advantage, giving a smoother coating, was made in the proportions of 40 parts tung-maleic compound, 15 parts concentrated aqueous ammonium hydroxide, 10 parts isopropyl alcohol and 35 parts water. Coatings applied by spraying with this composition showed practically no tendency to creep or sag.

Example 31

30 parts tung oil and 9 parts crotonic acid were heated to 180° C. for ½ hour but on cooling the acid separated from the oil in a mass of crystals. Mixture was then placed in a sealed tube and heated to 240° C. for 20 minutes. The mixture when cold was a clear oil showing no precipitation of acid. The viscosity of the oil was quite low considering the heat treatment. The product was not soluble in aqueous ammonium hydroxide. When the oil was applied to a surface and dried a film having a frosted effect was obtained.

Example 32

Itaconic acid apparently does not combine as readily with tung oil as maleic acid does. A mixture made in the proportion of 2 parts of itaconic acid and 4.5 parts tung oil was heated, considerable foaming occurring. The temperature was gradually raised to 260° C. but there were indications that the acid had either decomposed or volatilized, hence the test was repeated using a sealed tube in which the reaction mixture was heated in an oil bath. The temperature was taken to 230° C. and held there for 20 minutes. The product was a clear, very viscous oil, readily soluble in an aqueous ammonium hydroxide vehicle.

Example 33

Tung-maleic compound was made by heating 100 parts raw tung oil to 175° C., keeping at this temperature while gradually adding 35 parts maleic acid in small portions under constant stirring, then raising the temperature to 260° C.

140 parts of the tung-maleic compound made in this manner was mixed with 46 parts glycerol and 59 parts succinic acid. The mixture was heated gradually under constant stirring, samples being taken out at 180°, 200°, 213° and 220° C. At the last mentioned temperature conversion to a stiff gel occurred. The acid numbers were found to be as follows: At 180° C.—184; at 200° C.—177; at 213° C.—163. The samples which were withdrawn at 180° C. and 213° C. were insoluble in petroleum spirit but formed a cloudy solution in benzol which cleared on the addition of some methanol. These products also formed cloudy solutions in butyl acetate. In aqueous ammonium hydroxide soluble compounds were secured. The gel obtained at 220° C. also was soluble on long standing in dilute aqueous ammonium hydroxide.

Example 34

In Examples 28 and 29 blown tung oil was employed, while in the present example boiled tung oil was used.

Raw tung oil was heated to 240° C. and held at this temperature for 20 minutes to body it. This treatment resulted in a very viscous oil. Using 100 parts of the latter, the temperature was brought to 160° C. and 35 parts of maleic acid were added slowly. Much foaming took place, requiring careful addition of the acid. When the acid was introduced and the foaming had somewhat subsided the temperature was raised to 220° C. Some foaming occurred during this heating. The heating was checked at 220° C. because the mixture had grown perceptibly more viscous. When cold the product was found to be a very tacky rubber-like mass, soluble in dilute alkaline solutions such as those of ammonium or of sodium hydroxide. The solution in, for example, aqueous ammonium hydroxide was much more viscous than the solution of the compound made from raw tung oil and maleic acid.

Using 20 per cent of maleic acid based on the boiled tung oil, the temperature was taken to 220° C. and a product much less viscous resulted than that obtained when using 35 per cent of maleic acid. The 20 per cent compound is a very heavy oil, soluble in aqueous ammonium hydroxide.

Example 35

A resin was made by heating 91 parts of the free fatty acids of tung oil, 49 parts phthalic anhydride and 31 parts glycerol. This was heated to 220° C. and held at that point for half an hour. A resinous material was obtained having an acid number of 87.3. At 160° C. 39 parts maleic acid were added slowly, foaming taking place to considerable extent due to the high viscosity of the melt. The addition of the maleic acid extended over a period of half an hour. The temperature then was raised very cautiously to avoid undue foaming, about half an hour being required to heat from 160° C. to 200° C. A sample withdrawn at 200° C. was, when cold, a very rubbery, slightly tacky mass, and was soluble in aqueous ammonium hydroxide. Soon after the sample was taken the entire mixture changed (at about 202° C.) to an infusible rubber-like gel insoluble in organic solvents such as acetone or a mixture of alcohol and benzol.

This gel, however, is soluble in aqueous solutions of ammonium hydroxide or sodium hydroxide. A quantity of the gel was cut into small pieces and 10 parts of this comminuted material was digested with an ammonium hydroxide solution made from 4 parts of concentrated aqueous ammonia in 26 parts water. When the solution was poured on a panel to form a film it dried slowly.

Example 36

100 parts of raw tung oil were heated to 175° C. and thereupon 35 parts of maleic acid were added in small portions at a time, stirring vigorously, and when the acid had been fully introduced the temperature was raised to 260° C.

93 parts of this 35% maleic-tung oil compound was incorporated with 15.5 parts ethylene glycol and the mixture was heated, samples being withdrawn at 200° C., showing an acid number of 107; at 210° C., acid number 104; and at 220° C., acid number 99. After a short heating at 220° C. the composition gelled to a polymerized insoluble product.

Example 37

The 35% maleic-tung oil was used in the form as prepared in Example 36, but 140 parts thereof was heated with 15.5 parts ethylene glycol. At 200° C. the acid number was 122, at 210° C. the acid number was 112, and at 220° C. the acid number was 111. After a very brief heating in the neighborhood of 220° C. the composition gelled.

Example 38

The 35% maleic-tung oil prepared as given in Example 36 was used, 50 parts being heated with glycerol and ethylene glycol each 2.2 parts. At 200° C. the acid number was 121. When the temperature was raised to 210° C. the product was not found to be sufficiently soluble that an acid number could be secured. The temperature was raised to 220° C. and at the time a sample was withdrawn the temperature fell to 210° C. On reheating the composition gelled at 213° C. The products withdrawn at 200° and 210° C. are rather sticky, light brown resins of rather tough consistency.

Example 39

The 35% maleic-tung oil as prepared in Example 36 was employed, 33.2 parts thereof being incorporated with glycerol and ethylene glycol each 2.2 parts. The acid number of 114 was obtained on raising the temperature to 200° C. and this dropped to 111 at 210° C. The products at these temperatures were light brown, soft and sticky. The temperature was raised to 220° C. and the acid number found to be 110, the cooled product being slightly rubbery. On reheating the composition gelled at 213° C.

*Example 40*

35% maleic-tung oil made as described under Example 36 was employed, 140 parts thereof being heated with 62 parts of carbitol (monoethyl ether of diethylene glycol). Heat was applied gradually and from 200° C. to 250° C. samples were withdrawn with each increment of 10° in the temperature. When held for 10 minutes at 250° C. the reaction mixture gave a gel. During the heating the composition was very liquid up to the point of gelatinization. At 200° C. the acid number was 106, at 220° C. 101, and at 250° C., before gelatinization, 96. Except for the gel formed at 250° C. the samples were withdrawn at 10° intervals and all were soluble by treatment in concentrated aqueous ammonia and addition of water. Also, with the exception of the gel, these products were soluble in various solvents such as butyl acetate, benzol and methanol. In the latter solvent a cloudy solution was obtained which cleared on the addition of benzol. The products are all light brown colored, somewhat sticky and slightly rubbery.

*Example 41*

The 35% maleic-tung oil made in the manner described under Example 36 was used, 140 parts of this compound being heated with 26 parts of diethylene glycol with withdrawal from 200° C. and upwards to 250° C. of samples at 10° intervals. At 200° C. the acid number was 109, unchanged at 220° C. A definite gel formed at 250° C. but indications were that the conversion to the gel was going on gradually from 230° C., as a sample withdrawn at that temperature would not dissolve in acetone. The products withdrawn at 200° and 220° C. are soluble in butyl acetate, also in benzol and in methanol. In this case as in the preceding example the methanol solution was cloudy, clearing on the addition of benzol. The products are not soluble in petroleum spirit. The samples taken at 200° and 220° C. are light brown balsams, soluble in ammonia water.

*Example 42*

20 parts of monosodium maleate and 40 parts of tung oil were heated. The salt melted at about 100° C. and water was given off, due to water of crystallization present. The melted salt formed a layer under the oil. The temperature was slowly raised so as to avoid too much foaming and at about 200° C. the salt changed to a white solid. This was broken up and disseminated by stirring. The temperature was taken to 270° C. and the product when cold was a somewhat viscous oil with particles of a light brown solid suspended in it. Water was added and the solid dissolved. The water became dark brown on stirring and the oil floated on top of the water. On adding some sodium hydroxide to the aqueous solution a further quantity of the oil dissolved. It thus appears that the monosodium salt gives the diene synthesis partially, possibly due to decomposition into maleic anhydride which reacts and disodium maleate, which does not react.

*Example 43*

A series of tung-maleic compounds was made with proportions of maleic acid varying from 3 parts of the acid to 100 parts tung oil up to 45 parts of acid to 100 parts tung oil. The oils were prepared in the same manner, to wit, the tung oil was heated to 175° C. and the maleic acid added gradually. After the maleic acid was introduced the mixture was heated with stirring to 275° C. and allowed to cool.

An examination of these products shows the viscosity to increase as the percentage of maleic acid increases. The color darkens progressively and becomes more fluorescent as the percentage of maleic acid increases. On applying films to a surface and allowing them to dry overnight, it is noted that the films are softer as the percentage of maleic acid increases. The 3% maleic acid sample gave a film on drying which was frosted over most of the surface. The 5% maleic acid sample gave a clear film which at the edges was slightly frosted. This latter observation also applies to the 10, 15 and 20 per cent maleic acid samples. The film obtained with the 25% maleic acid sample was clear, entirely free from any frosting at the edges. Likewise the 30, 35, 40 and 45 per cent maleic acid samples dried clear throughout.

Aqueous ammoniacal solutions were prepared with the tung-maleic oil in 50% concentration. The 3% sample did not dissolve but gave a white emulsion. When this was applied to a surface "crawling" took place producing segregated portions leaving the surface bare in places. The portions of the oil which had gathered in this way on drying showing frosting or crystallization. The 5% maleic sample gave a smooth emulsion which forms a continuous film when applied to a surface and dries with frosting at the edges. The film obtained is quite tough. On standing the emulsion thickened. The 10% maleic sample also gave an emulsion which was quite heavy, which when smeared on glass dried to a clear film with slight crystallization at the edges. The 15% maleic sample yielded a translucent viscous solution, showing that the borderline between emulsions and complete solubility lies between 10 and 15 per cent of maleic acid. The film after drying showed a very slight degree of crystallization at the edge. The 20% maleic sample likewise gave a clear solution, a film of which on drying showed a very slight degree of crystallization. The 25% maleic sample yielded a clear solution in the same manner. The dried film was entirely clear. The 30, 35, 40 and 45 per cent maleic samples gave clear solutions in ammonium hydroxide and likewise yielded clear films on drying, although these films became softer as the proportion of maleic acid increased.

Thus coating compositions ranging from emulsions to clear aqueous solutions can be obtained by modifying the proportion of maleic acid, such solutions being employed according to conditions in various finishing operations such as the priming of iron or steel in sheet form or otherwise and also for priming and finishing various non-ferrous metals such as copper, brass, zinc, galvanized iron, and the like. While these compositions may be used simply as primers, they also may be employed as second or third coats to form a plurality of coats or, if desired, one or more coats may be of the tung-maleic compound and other coats may be of oil varnish, nitrocellulose lacquer, cellulose acetate coating compositions, shellac, and so forth. These coatings may be air-dried or baked as desired. Since very flexible coatings can be obtained, the tung-maleic oil in water solution may be applied by spraying or otherwise to tinfoil, aluminum foil, and the like, to form coatings which may serve to reduce transmission of moisture through the foil, such material being proposed as wrapping for cigarette packages, and the like. Other materials which may be coated are wire, an example of which has already been given; plaster and cement or concrete. In the treatment of the plaster the tung-maleic compound may be employed as a size and/or as a flat wall finish. In the case of concrete containing Portland cement, and the like, or other calcareous materials of construction, the aqueous tung oil compound may be expected to react with calcium oxide or other material present to form insoluble calcium tung maleate. Paper may be coated with the oil solutions and if of a porous character impregnation will take place giving a more or less translucent product, depending on the thickness of the paper. Tissue paper, including that known as glassine, when thus impregnated may be used as a wrapping paper for products in which moisture is to be retained or those which are to be protected from external moisture.

Example 44

Using nitrocellulose, lacquers were made by mixing the maleic-tung oil with nitrocellulose in solution in butyl acetate and toluol, the proportions being 5 parts half second nitrocellulose, 10 parts oil, 15 parts each butyl acetate and toluol. The oils prepared with progressive amounts of maleic acid as described in Example 43 were used. The solutions ranging from 3% to 45% maleic acid combined in the oil all were clear. The nitrocellulose and maleic oil films obtained by drying the solutions all were clear. The hardness of the film was found to increase as the percent of maleic acid combined in the oil was increased.

Example 45

The solubility in petroleum spirit was tested in the case of the oils made with progressively increasing proportions of maleic acid described in Example 43. The petroleum spirit used was a commercial grade known as Varnolene. When added to raw tung oil and boiled tung oil this petroleum spirit was miscible in all proportions. Likewise it was found miscible in all proportions with the 3%, 5% and 10% maleic tung oil. A moderate quantity of the Varnolene could be added to the 15% maleic tung oil, somewhat in excess of the volume of the oil, but after additions amounting to over 3½ times the volume of the oil, separation occurred. With the 20% maleic tung oil an equal volume of Varnolene could be added without separation, but above that separation occurred. The 25% maleic tung oil permitted the addition of only about half its volume of this petroleum spirit, thereafter separation occurring. The 30%, 35%, 40% and 45% maleic tung oil samples were not soluble in Varnolene.

(It should be noted that in Examples 13, 14, 15, 16 and 17, 35 per cent of maleic acid was used based on the tung oil employed, while in Examples 6, 7, 8, 9 and 11 the proportion was 40 per cent maleic acid on the tung oil.)

Example 46

In making the maleinized tung oil the following procedure was found useful. 1,000 parts tung oil was placed in an enamel kettle and heated to 175° C. A stirrer was provided which had agitators both below and above the surface of the oil. The lower agitator is intended to agitate the oil and the superposed one serves to beat down the foam during the period when maleic acid is being added. 350 parts maleic acid are added at intervals, the total time consumed for such additions being about 20 minutes. The temperature then is raised to 265° C., a period of 10 minutes or more being required, and is held at this temperature for about 15 minutes. The product obtained by such procedure was a clear, viscous, somewhat fluorescent oil having a specific gravity of 1.07 at 30° C. During the heating operation a small amount of white crystals sublimed. The time required for the addition of the maleic acid to avoid undue foaming will depend upon the size of the batch under preparation as well as the speed of foam agitation. The period during which the temperature is raised from 175° to 265° C. also will vary with the size of the batch. It should be noted that the oil obtained is heavier than water.

Example 47

In order to avoid "crawling" of a coating of the tung-maleic compound the addition of a lower alcohol, such for example as isopropyl alcohol, to the water solution is desirable. Products suitable for spraying were made as follows:

(a) 40 parts tung-maleic oil made with 35% of maleic acid, 15 parts concentrated ammonium hydroxide solution, 15 parts isopropyl alcohol, 45 parts water and 5 parts of a 5% ammoniacal solution of cobalt acetate. 40 parts of lithopone was ground in this solution, giving a white paint which sprayed on a vertical metal surface without crawling or sagging. Allowed to air-dry a white, glossy coat of uniform surface character resulted.

(b) The same composition applied by spray-gun was baked at 70° C., giving a glossy coat not quite as white as that obtained by air-drying according to (a).

(c) A coating solution similar to (a) was prepared, except that cobalt acetate was omitted, and 4 parts of glycerol were added. This sprayed satisfactorily when applied to a metal sheet. The sheet was baked at 70° C., giving a uniform, tough, glossy surface.

Example 48

A thin metal panel coated with a baked layer of the composition of Example 47 (c) was chilled to 22° F. and then quickly bent double. There was no sign of cracking.

Example 49

Various salts of tung-maleic acid were prepared using two compounds of the tung-maleic material, one made with 20 per cent and the other made with 35 per cent of maleic acid based on the tung oil used. These compounds were dissolved in aqueous sodium hydroxide employing just sufficient of the alkaline solution to dissolve the compounds adequately. This solution was then treated with solutions of various reagents such as calcium chloride, zinc chloride, aluminum sulphate (alum), cadmium chloride, lead nitrate, cobalt nitrate, manganese sulphate and copper chloride, to form respectively the calcium, zinc, aluminum, cadmium, lead, cobalt, manganese and copper tung maleates. The precipitates which formed were washed with water and in some cases with alcohol, giving products in finely divided form.

In a similar manner products may be obtained by a fusion method, namely, by heating, for example, oxides or hydroxides of metals such as calcium, zinc, cadmium, lead, cobalt, copper, and the like, with the tung-maleic acid until solution of the metallic base occurs.

Example 50

When the tung-maleic acid is treated with ammonia gas reaction takes place to form the ammonium compound. A suitable way of accomplishing this is to dissolve the tung-maleic compound in a solvent such as acetone using, for example, equal volumes of acetone and tung-maleic acid made with 35% of maleic acid based on the tung oil employed. Dry ammonia gas then is bubbled through this solution, the gas being very quickly absorbed at first. Later large bubbles rise to the surface. When the odor of ammonia in the solution becomes distinctly perceptible the treatment is stopped. The ammonium compound of the tung-maleic acid forms and settles as a heavy oil. The ammoniacal acetone medium is decanted leaving an oil which dissolves readily in water and its aqueous solutions show a relatively low viscosity. This is probably due to the substantial absence of formation of soaps with the tung acids themselves.

In like manner the tung-maleic acid may be treated with ammonia under pressure, preferably with agitation to form the desired ammonium compound.

Example 51

Tung-maleic acid or a composition made by heating tung oil with 13 per cent of its weight of maleic acid was treated with ammonia gas under a pressure of several pounds, the gas being forced into a strong vessel containing a powerful agitator in which combination with ammonia was allowed to take place. The product thickens as ammonia is introduced. A lumpy solid was obtained in this manner which, as determined by the odor, contained free ammonia. This lumpy material was placed in a ball mill and ground to a powder. The powder was found to be soluble in water. By admixing dry pigments with this powder a coating composition may be prepared which is ready for use on the addition of water and stirring until the ammonium tung maleate has dissolved and the pigment is well suspended. Various proportions of pigment may be incorporated, depending upon their pigmentary value and the shades desired.

Thus, tung-maleic acid was prepared by reaction as previously described between tung oil and maleic acid, using 35 per cent of the latter. This product was placed in a water-jacketed autoclave provided with a powerful stirrer and ammonia gas was admitted at intervals to create pressure in the neighborhood of ten pounds, the ammonia being introduced over a period of about 2 hours. Each time a fresh supply of ammonia gas was introduced such thickening occurred that the agitator almost stopped. The product obtained was a mixture of a mealy material interspersed with lumps which may have been the result of local overheating or insufficient agitation. Through the jacket water was passed during the ammonification to keep the temperature reasonably low. To eliminate the lumps the material was placed in a ball mill and ground for 1 hour. The powder obtained was found to be readily soluble in water. However, a portion of it placed in strong sunlight sintered together and possibly absorbed moisture from the air, but in any event the light yellow colored meal was transformed into a transparent light brown gum by such exposure and in half an hour was found to be insoluble in water.

Equal parts by weight of this meal and lithopone were placed in a ball mill and ground together for 1 hour. On removal from the ball mill the powdered product thus obtained was placed in cans to exclude free access of air, it having been noted that humid air rather quickly caused the powder to aggregate into lumps. Some of this pigmented powder was treated with water, different proportions of water giving solutions of varying viscosity. Enough water was added to make a composition of the viscosity of paint and this was applied to a surface, giving an excellent pigmented finish.

It should be noted that the ammonia or other base (including volatile amines such as methyl and ethyl amines, also compounds of the nature of pyridine) used in preparing the tung-maleic compound should, as far as possible, combine only with the maleic group in the tung complex. If the ammonia combines with the tung acids themselves, that is at the normal carboxyl group of the eleomargaric acid or other acids of tung oil containing the conjugated diolefin grouping forming the diene synthesis, the resulting soap acts as a thickening agent and increases the viscosity unduly for some coating operations. Therefore, the treatment with ammonia should, as far as possible, be such that the gas unites with the carboxyls at the locus of diene synthesis rather than with the tung acids themselves. If the free tung acids are used soaps are more easily formed than when the normal glyceride oil is treated with maleic acid. Ammonium tung maleate, therefore, preferably is made in the manner described reasonably free from ammonium soaps of the fatty acids of tung oil. On the other hand, I may employ the free tung acids or the carboxyl group of said acids as the place for combination of cobalt or other drying agents.

When the ammonium soaps of tung oil do form and cause an increase in viscosity of the coating composition with consequent poor brushing qualities, this defect may be corrected by the addition of a small amount of an appropriate solvent such as isopropyl alcohol, e. g., a mixture of the pigmented ammonium tung maleate 40 parts, water 30 parts, and isopropyl alcohol 6 parts gives better results than when water alone is used as the solvent vehicle.

What I claim is:

1. In the art of rendering tung oil soluble in aqueous ammonia, the steps which consist in treating tung oil with a reactive unsaturated acid whereby union of the tung oil with said unsaturated acid occurs and a product soluble in aqueous alkaline solution results, and treating said reaction product with ammonia.

2. The process of producing reaction products which comprises heating a compound selected from the group of a drying oil and drying oil acids with an organic compound that decomposes at the temperature employed to give a compound containing the group —CO—CH= reactive with the compound selected from the group containing the drying oil and drying oil acids, and treating the reaction product with ammonia.

3. An ammonium salt of a heat reaction product of tung oil and maleic acid.

4. An ammonium salt of a heat reaction product of tung oil and maleic acid containing 12–20% of maleic acid based on the tung oil.

5. An ammonium salt of a heat reaction product of tung oil and maleic anhydride, in powdered form.

6. An ammonium salt of a heat reaction product of tung oil and an unsaturated organic carboxylic acid.

7. An ammonium salt of a heat reaction product of a component selected from the group consisting of tung oil and tung oil acids, with an organic compound containing the group —CO—CH= reactive therewith.

8. An ammonium salt of a heat reaction product of tung oil and maleic acid, in which the ammonia is combined with the maleic acid carboxyl group.

9. An ammonium salt of a heat reaction product of tung oil and maleic acid, in which the ammonia is combined with the tung acid carboxyl group.

10. The process of producing reaction products which comprises passing ammonia through a solution of a heat reaction product of tung oil and maleic acid until an ammonium salt of the stated heat reaction product is formed in substantial amount.

11. The process of producing reaction products which comprises reacting a heat reaction product of tung oil and maleic acid with ammonia under pressure until an ammonium salt of the heat reaction product of tung oil and maleic acid is formed in substantial amount.

12. An ammonium salt of a heat reaction product of from 3 to 45 parts by weight of maleic acid with 100 parts of tung oil.

13. An ammonium salt of a heat reaction product of from 25 to 45 parts by weight of maleic acid with 100 parts of tung oil.

14. The process of forming reaction products which comprises reacting on a compound selected from the group of tung oil and tung oil acids, with an acidic compound containing the —CO—CH= group reactive therewith, at temperatures between 125° C. and the boiling point of the compound containing the —CO—CH= group, and treating the reaction product formed with ammonia.

15. An ammonium salt of a heat reaction product of a drying oil and a compound selected from the group of maleic acid, fumaric acid, maleic anhydride, fumaric anhydride, itaconic acid, citraconic acid, maleinanilic acid, cinnamic acid, acrolein, crotonaldehyde, benzoquinone and naphthoquinone.

CARLETON ELLIS.